United States Patent

Szarvasi et al.

[11] B 3,914,379
[45] Oct. 21, 1975

[54] SUBSTITUTED (NITROFURYL-ACRYLIDENE) HYDRAZINES WITH ANTIBACTERIAL PROPERTIES

[75] Inventors: Etienne Szarvasi, Charbonnieres-les-Bains; Louis Fontaine, Lyon, both of France

[73] Assignee: Lipha, Lyonnaise Industrielle Pharmaceutique, Lyon, France

[22] Filed: July 13, 1973

[21] Appl. No.: 379,172

[44] Published under the Trial Voluntary Protest Program on January 28, 1975 as document no. B 379,172.

Related U.S. Application Data

[63] Continuation-in-part of Ser. No. 215,677, Jan. 5, 1972.

[30] Foreign Application Priority Data

Jan. 7, 1971 France .............................. 71.00283

[52] U.S. Cl. ................................. 424/275; 424/285
[51] Int. Cl.² .......................................... A61K 31/38
[58] Field of Search .................................... 424/275

[56] References Cited
OTHER PUBLICATIONS

Stvadins et al., Latviajas PSR Zinatnu Akad. Vestis, 1958, No. 1, pp. 113–120.
Chemical Abstracts 54: Col. 20085g (1960).

*Primary Examiner*—Jerome D. Goldberg
*Attorney, Agent, or Firm*—Browdy and Neimark

[57] ABSTRACT

Compounds of the formula

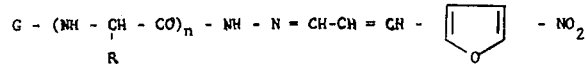

in which $n = 1$ or O, G is a member of the group formed by the furoyl, thenoyl, nitrothenoyl and carbobenzoxy radicals and R, when $n = 1$, is a member of the group formed by hydrogen, the methyl, butyl, isobutyl, δ-(2-furoyl) amino-butyl, hydroxymethyl, benzyl and p-hydroxybenzyl radicals, are endowed with antibacterial properties, and are useful in bacteriocidal compositions.

9 Claims, No Drawings

SUBSTITUTED (NITROFURYL-ACRYLIDENE) HYDRAZINES WITH ANTIBACTERIAL PROPERTIES

This is a continuation-in-part application of Serial No. 215,677, filed Jan. 5, 1972.

The present invention relates to bacteriocidal compositions containing substituted (nitrofurylacrylidene) hydrazines, and the processes for the applications thereof.

The compounds according to the invention are useful in the antibacterial field. Certain nitrofurans are known and used in pharmacy and in the veterinary field, such as particularly the N-(2-furfurylidene)-3-amino-2-oxazolidone, known under the commercial mark "Furoxone" and the N-(2-furylidene)-3-amino-hydantoin, at present known under the commercial mark FURADOIN. These known products used in pharmacy do, however, have inconveniences, such as an emetic effect.

The novel nitrofurans of the present invention, as well as having an appreciable antibacterial activity at a toxicity level of the same order as that of Furoxone, and decidedly lower than that of Furadoin, have the very great advantage of not being emetic.

The (nitrofurylacrylidene) hydrazines of the invention are represented by the formula:

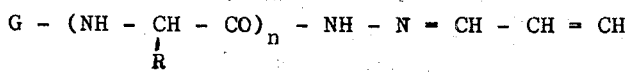

in which
n = 1 or 0;

G is a furoyl, thenoyl, nitrothenoyl or carbobenzoxy radical;

and R, when n = 1, is hydrogen, a methyl, butyl, isobutyl, δ-(2-furoyl)-aminobutyl, benzyl, hydroxymethyl or p-hydroxybenzyl radical.

It is possible to obtain these novel hydrazines by reaction of 5-nitro-2-furyl acrolein with a hydrazine which is represented by the formula

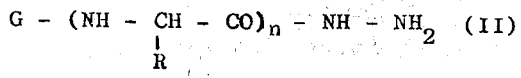

in which n, G and R have the same meanings as in formula I. These hydrazines can be obtained by hot condensation in organic solvent medium. Novel substituted hydrazides, which can be used particularly as intermediaries in the synthesis of the compounds according to formula I, are represented by the formula

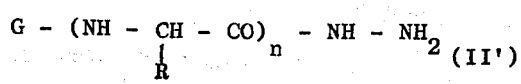

in which
n = 1 or 0;
G is a furoyl, thenoyl, nitrothenoyl or carbobenzoxy radical, except when R is hydrogen, a hydroxymethyl or p-hydroxybenzyl radical;
and R is hydrogen, a methyl, butyl, isobutyl, hydroxymethyl, p-hydroxybenzul, benzyl or furoylbenzyl radical.

These hydrazides can be obtained by reacting the hydrazine with an amino ester of formula

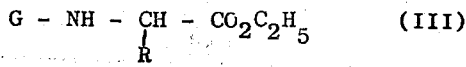

According to one variant, the process can be used in the presence of a catalytic quantity of acid, such as acetic acid.

Certain novel amino esters can be used particularly as intermediaries in the synthesis of hydrazides and hydrazines as previously described. These amino esters are represented by the formula:

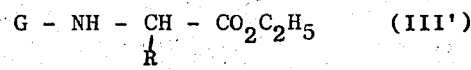

in which G is a furoyl radical, when R is a methyl, δ-(2-furoyl)-aminobutyl or p-hydroxybenzyl radical, a thenoyl radical when R is hydrogen, a butyl or isobutyl radical, a nitrothenoyl radical when R is a hydroxymethyl or benzyl radical, or carbobenzoxy when R is an isobutyl radical.

These amino esters can be obtained by reacting an amino ester of formula

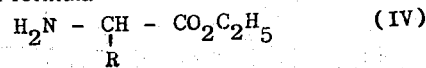

with an acid chloride of formula G - Cl, in which G and R have the same meanings as in formula (III'), in the

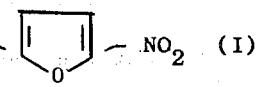

presence of an alkali agent. According to variants, the alkali agent is mineral or organic, such as the acid carbonate of sodium, triethylamine, pyridine.

The novel (nitrofurylacrylidene) hydrazines are distinguished by their ability to inhibit the growth of bacteria. This effect extends to gram-positive and gram-negative organisms.

Biological research has made apparent the importance of the nature of the protective group G of the general formula I. The effect of these groups can be classed in the following order:

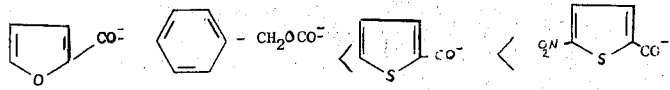

Since it has been established to be advantageous to select the heterocyclic carrier of the $NO_2$ - group participating in the formation of the Schiff base from the family of furans and thiphenes, the biological activity being completely lost when they are replaced by the isostere: pyrol, the [$N^1$ - (5'-nitro-2'-thenoyl)-$N^2$ - (5''-nitro-2''-furyl-acrylidene)] -hydrazine and [$N^1$ - (5'-nitro-2'-thenoyl glycyl)-$N^2$-(5''-nitro-2''furyl acrylidene)] hydrazine form particularly outstanding active principles.

These two products have an activity "in vitro" which is identical with that of "Furoxone" for an equal toxicity. In addition, a particularly important fact is that these active principles are free from any emetic effect on dogs, even in a strong dose.

The medicaments of the invention have low toxicity, the strongest dose tolerated by mice by oral route being at least 3200 mg/kg.

The results of pharamcological tests are set out in the following tables I and II.

In table I, the control substance is Furoxone and in table II it is Furadoin.

The antibacterial coefficients have been determined in vitro in the majority of cases on specific E. COLI strains.

TABLE I

| Example | Antibacterial coefficient | LD50-Kg perorally mice |
|---|---|---|
| Control | 100 | |
| Ex. 1 | 0 | |
| Ex. 2 | 106 | 3,200 mg |
| Ex. 3 | 115 | >3,200 mg |
| Ex. 4 | 120 in vitro | >3,200 mg |
|  | 73 in vivo | |
| Ex. 5 | 175 | >3,200 mg |
| Ex. 7 | 58 | >3,200 mg |
| Ex. 8 | 75 | >3,200 mg |
| Ex. 9 | 118 | >3,200 mg |
| Ex. 10 | 97 | >3,200 mg |
| Ex. 12 | 120 | >3,200 mg |
| Ex. 13 | 113 | >3,200 mg |
| Ex. 14 | 94 | >3,200 mg |
| Ex. 15 | >100 on gram-positive germs | >3,200 mg |
| Ex. 16 | 95 | 3,200 mg |

TABLE II

| Example | Antibacterial coefficient | LD50-Kg perorally mice |
|---|---|---|
| Control | 100 | |
| Ex. 6 | 115 | >3,200 mg |
| 11 | 140 | 3,200 mg |

The daily dose sufficient to obtain the desired therapeutic effect on a human being varies from approximately 10 to 500 mg. More particularly, effective results are obtained using 10 mg. of active compound per kg. of weight of the patient. The preferred posology for adults consists of 600 mg. per day in three 200 mg. doses. These compounds are administered orally as antibacterial agents effective against gastrointestinal infections, e.g. for bacterial infections of the urinary tract.

These compounds can be easily administered: the pharmaceutic doses can be formulated in the usual manner, with the aid of conventional excipients and adjuvants in the form of powders, suspensions and tablets, suppositories, etc. for internal administration and ointments and salves for topical administration.

Examples illustrating the invention in a nonlimiting manner are given below.

EXAMPLE 1

$N^1$ - [2-thienyl acetyl] -$N^2$ - [5'-nitro-2'-pyrrolylidene] - hydrazine

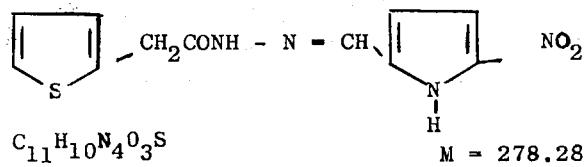

$C_{11}H_{10}N_4O_3S$      M = 278.28

3.9 g (mol/40) of (2-thienyl acetyl) hydrazide are dissolved in 32 ml of methanol, whereafter 3.5 g (mol/40) of 5-nitro-2-pyrroladehyde in 35 ml of tetrahydrofuran are added. Heating under reflux takes place for 5 hours. After cooling, adding ether and then cooling in the refrigerator, there are obtained:
1st cut : 3.6 g - yellow Mp = 188°–190° C,
2nd cut : 1.7 g - yellow Mp = 190°–192° C.
The yield is 5.3 g. i.e. 76 % (theoretical yield = 6.95 g).

The 1st cut, after being recrystallised twice from isopropanol and dried at 50° C under strong vacuum, melts at 192°–194° C.

Gravimetric analysis:

|  | C% | H% | N% | S% |
|---|---|---|---|---|
| Calculated : | 47.46 | 3.62 | 20.13 | 11.52 |
| Found : | 47.37 | 3.65 | 19.92 | 11.66 |

EXAMPLE 2

$N^1$ -[$N'$-2'-furoyl (±) alanyl]$N^2$ -[5''-nitro-2''furyl-acrylidene]-hydrazine

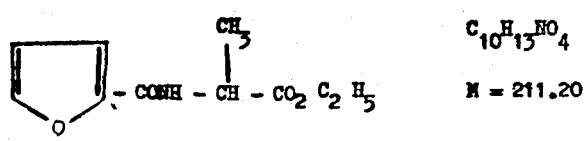

$C_{15}H_{14}N_4O_6$      M = 346.29 a. N - 2 - furoyl (±) alanine ehtyl ester :

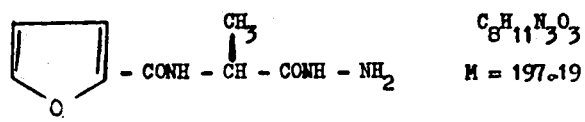

$C_{10}H_{13}NO_4$      M = 211.20

23.4 g (mol/5) of (±) alanine ethyl ester are dissolved in 100 ml of dry benzene. 20.3 g (mol/5)=20.22 g) of triethylamine are added, followed by dropwise addition of 26.1 g (mol/5) of furoyl chloride. The temperature is raised from 22° to 35° C and there is a precipitation of crystals of

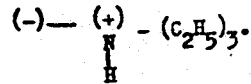

After suction-filtering, washing with water and drying, and also evaporation of the solvent, there is obtained a quantitative yield of 42.2 g of product of Mp = 68°–71° C. After being recrystallised twice (diisopropylether) the melting point is 72°–73° C.

Gravimetric analysis:

|  | C% | H% | N% |
|---|---|---|---|
| Calculated : | 56.85 | 6.20 | 6.63 |
| Found : | 56.83 | 6.19 | 6.58 | b. $N^1$ -[$N'$ - 2' - furoyl (±) alanyl]- hydrazide :

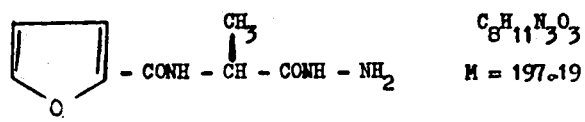

$C_8H_{11}N_3O_3$      M = 197.19

21.1 g (mol/10) of N-furoyl (±) alanine ethyl ester, 20.2 g (mol/2.5)=20 g of $NH_2$—$NH_2$.98% $H_2O$ and 0.5 ml of acetic acid are heated under reflux for 5 hours.

After evaporation to dryness, the oily residue which is obtained is dispersed under ether and this is solidified. A white product of Mp = 115°–120°C is obtained with a quantitative yield, this product melting at 132°–133° C after being recrystallised twice from isopropanol.

Gravimetric analysis :

|  | C% | H% | N% |
|---|---|---|---|
| Calculated : | 48.72 | 5.62 | 21.31 |
| Found : | 48.61 | 5.77 | 21.17 | c. $N^1$ -[$N'$ - 2 - furoyl (±) alanyl]- $N^2$ -[5'' - nitro-2''-furyl acrylidene]- hydrazine :

10 g (mol/20)=(9.85 g) of $N^1$ -[$N'$-furoyl (±) alanyl]-hydrazide, in 120 ml of methanol, and 8.4 g (mol/20 = 8.35 g) of 5-nitro-2-furyl acrolein, in 63 ml of tetrahydrofuran, are heated together under reflux for one hour. After concentration to half volume, cooling in a refrigerator, suction-filtering, washing with isopropanol and then with ether, 11.8 g of product are obtained with a yield of 80.5 % (theoretical yield = 14.65 g), the product having a melting point of 192°–195° C (with decomposition). After recrystallisation from acetone, the melting point is 197.5°–198.5° C with decomposition.

Gravimetric analysis :

|  | C% | H% | N% |
|---|---|---|---|
| Calculated : | 52.02 | 4.07 | 16.18 |
| Found : | 51.96 | 4.13 | 16.07 |

EXAMPLE 3

$N^1$ -[$N'$ - carbobenzoxyglycyl]- $N^2$ -[5'-nitro-2'-furylacrylidene]-hydrazine

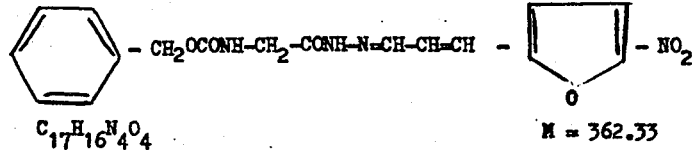

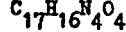

7 g (mol/31.8) of $N^1$ -[$N'$-carbobenzoxyglycyl)-hydrazide are dissolved at ambient temperature in 80 ml of methanol. There are then added dropwise 5.3 g (mol/31.8) of 5-nitro-2-furyl acrolein in 53 ml of tetrahydrofuran. Heating under reflux takes place for 1 hour, followed by concentration to half volume. A crystallisation is produced, and the formed crystals are suction-filtered and washed with ether. There are obtained 8.7 g of crystals melting at 159–160° C, with a yield of 74.2% (theoretical yield = 11.7 g). After recrystallisation (methanol), the melting point is unchanged.

Gravimetric analysis :

|  | C% | H% | N% |
|---|---|---|---|
| Calculated : | 54.83 | 4.33 | 15.04 |
| Found : | 54.92 | 4.38 | 15.06 |

EXAMPLE 4

$N^1$-[$N'$-2'-thenoylglycyl]-$N^2$-[5''-nitro-2''furyl acrylidene]- hydrazine

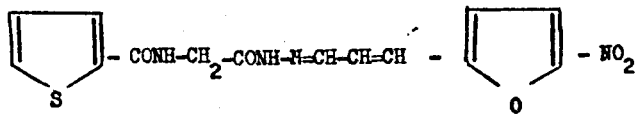

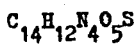

a. Ethyl-N-thenoyl-2-glycocollate :

Method A

To 14.2 g (mol/7.25) of ethyl glycocollate in solution in 70 ml of pyridine are added dropwise 20.2 g (mol/7.25) of 2-thiophene carboxylic acid chloride. Agitation takes place for 1 hour at ambient temperature and then the mixture is poured into iced water. Suction-filtering, 1st cut : 19.4 g coloured. Mp = 86°–88° C. The mother liquors, extracted with ethyl acetate, yield a second cut : 6 g coloured, Mp = 86°–88° C. Yield : 25.4 g = 86.4 % (theoretical yield = 29.4 g).

Method B

To a solution of 21.1 g (mol/6.6) of ethyl gylcocollate hydrochloride, in 150 ml of water, containing 25.3 g (mol/3.3) of $NaHCO_3$, there are simultaneously added while stirring well : 24.1 g (mol/6.6) of 2-thiophene carboxylic acid chloride and 38 ml of an aqueous solution containing 12.7 g (mol/6.6 #) of $NaHCO_3$. The time taken for the addition is 15 minutes. Heating at 50° C takes place for 1 hour. The solid is precipitated on completing the addition. After suction-filtering, washing with water, there are obtained 25.5 g = 79% (theoretical yield : 32.2 g) of coloured product, Mp = 88°–90° C.

After recrystallisation, (diisopropyl ether + ethyl acetate), a white product of Mp = 90°–90.5° C is obtained.

Gravimetric analysis :

|  | C% | H% | N% | S% |
|---|---|---|---|---|
| Calculated : | 50.70 | 5.20 | 6.57 | 15.04 |
| Found : | 50.72 | 5.23 | 6.54 | 14.99 |
| – ν NH | 3,400 cm⁻¹ | | | |
| – ν CH = CH (thiophene) | 3,120 cm⁻¹ | | | |
| – ν CO (ester) | 1,740 cm⁻¹ | | | |
| – ν CO (conjugated amide) | 1,650 cm⁻¹ | | | | b. $N^1$-[$N'$-2'-thenoylglycl]-hydrazide:

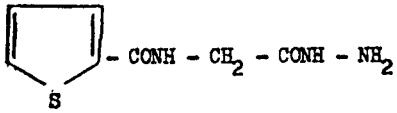

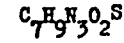

21.3 g (mol/10) of ethyl N-2-thenoyl glycocollate, 20 g (mol/2.5) = 20 g) of 98 % hydrazine, 30 ml of isopropanol and 0.4 ml of acetic acid are mixed. A heating is produced, followed by crystallisation. The crystals are left at ambient temperature for a few hours and then in a refrigerator. After suction-filtering, washing with ether, there are obtained : 19.9 g = 97 % (theoretical yield : 19.9 g) of solid melting at 176°–177° C. After recrystallisation (water) and drying at 100°C under vacuum, Mp = 178°–179° C.

Gravimetric analysis :

|  | C% | H% | N% | S% |
|---|---|---|---|---|
| Calculated : | 42.20 | 4.53 | 21.10 | 16.10 |
| Found : | 42.29 | 4.60 | 21.05 | 16.16 |

- $\nu$ NH          3,300 cm$^{-1}$
- $\nu$ CO (conjugated)  1,630 – 1,650 cm$^{-1}$
- $\nu$ CO          1,670 cm$^{-1}$
- $\nu$ CH = CH (thiophene)  3,080 cm$^{-1}$
- $\nu$ C = C (thiophene)   855 cm$^{-1}$ – 1,030 cm$^{-1}$ – 1,060 cm$^{-1}$ c. $N^1$-[N'-2'-thenoylglycyl]-$N^2$-[5''-nitro-2''-furylacrylidene]- hydrazine :

8 g (mol/25) = 7.95 g) of $N^1$-[N'-2'-thenoylglycyl]-hydrazide are dissolved at 60° C in 200 ml of ethylene glycol. At a temperature of 50° C, 6.8 g (mol/25) of 5-nitro-2-furyl acolein in 68 ml of tetrahydrofuran are introduced. Crystallisation is produced a few minutes after the addition. Heating takes place at 50° C for 30 minutes. After suction-filtering and washing with ether, there are isolated 13.8 g of solid with a melting point of 233°–234° C (with decomposition) and with a yield of 99.3 % (theoretical yield = 13.9 g). After recrystallization from a mixture of dimethyl formamide and ether, the melting point is 233° C (with decomposition).

Gravimetric analysis :

|  | C% | H% | N% | S% |
|---|---|---|---|---|
| Calculated : | 48.27 | 3.47 | 16.08 | 9.20 |
| Found : | 48.19 | 3.43 | 15.98 | 9.30 |

- $\nu$ NH          3,380 cm$^{-1}$
- $\nu$ CO          1,690 cm$^{-1}$
- $\nu$ CO conjugated  1,645 cm$^{-1}$
- $\nu$ C-NO$_2$    1,510 and 1,550 cm$^{-1}$
- $\nu$            1,020 cm$^{-1}$

X

EXAMPLE 5

$N^1$-[5'-nitro-2'-thenoylglycyl]-$N^2$-[5''-nitro-2''-furyl acrylidene]- hydrazine

$C_{14}H_{11}N_5O_7S$    M = 393.33 a) $N^1$-[5'-nitro-2'-thenoylglylcyl]-hydrazide :

$C_7H_8N_4O_4S$

M = 244.22

21.2 g (mol/12.15) of ethyl 5-nitro-2-thenoyl glycocollate are dissolved in 480 ml of methanol and the solution has added thereto very slowly, at a temperature of 5° C, 12.8 g (mol/4 = 12.5 g) of NH$_2$-NH$_2$, 98 % H$_2$O in 40 ml of methanol. The mixture is cooled to 0° C and agitation is continued for 2 hours at this temperature. 45 minutes after the commencement of the cooling, crystallisation occurs. After suction-filtering (difficult) in the presence of ether, there are obtained :

1st cut : 11.5 g, yellow, Mp = 186°–187° C
2nd cut : 4.8 g, yellow, Mp = 189.5°–190° C. The yield is 16.3 g = 80.5 % (theoretical yield : 20 g).

After being recrystallisation twice (water), Mp = 190.5°–191° C.

Gravimetric analysis :

|  | C% | H% | N% | S% |
|---|---|---|---|---|
| Calculated : | 34.42 | 3.30 | 22.94 | 13.13 |
| Found : | 34.55 | 3.34 | 22.90 | 13.25 |

- $\nu$ NH         3,300 cm$^{-1}$
- $\nu$ CO         1,680 cm$^{-1}$
- $\nu$ CO conjugated  1,640 cm$^{-1}$
- $\nu$ NO$_2$     1,580 cm$^{-1}$ b. $N^1$-[5'-nitro-2'-thenoylglycyl]-$N^2$-[5''-nitro-2''-furylacrylidene]- hydrazine :

At a temperature of 60° C, 6.1 g (mol/40) of $N^1$-[nitro-2'-thenoylglycyl]-hydrazide are dissolved in 200 ml of ethylene glycol. At the same temperature, 4.2 g (mol/40) of 5-nitro-2-furyl acrolein in 42 ml of tetrahydrofuran are introduced into the solution. Heating takes place for 1 hour at 60° C. A precipitation of red crystals is observed after cooling. (In certain cases, after heating for half an hour). After filtering with suction and washing with water, there are obtained 8.1 g, yield = 82.6 % (theoretical yield : 9.84 g) of an orange product, Mp = 217°–218° C.

After recrystallisation (8.1 g in 875 ml of ethyl acetate) and drying to constant weight at 140° C under a strong vacuum, the melting point is 222°–224° C (with decomposition).

Gravimetric analysis :

|  | C% | H% | N% | S% |
|---|---|---|---|---|
| Calculated : | 42.76 | 2.81 | 17.81 | 8.15 |
| Found : | 42.70 | 3.04 | 17.78 | 8.09 |

I R Analysis :

- $\nu$ CO   ( 1,720 cm$^{-1}$ (CO of the enolised hydrazide—OH)
             ( 1,650 cm$^{-1}$ conjugated CO   - C=N-)
- $\nu$ NO$_2$    1,550 cm$^{-1}$
- $\nu$ C-H      1,370 cm$^{-1}$
- $\nu$ NH       3,250 cm$^{-1}$

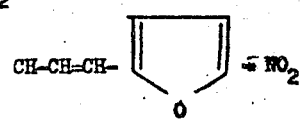

3,100 cm$^{-1}$ 3,150 cm$^{-1}$

EXAMPLE 6

N¹-[2'-thenoyl]-N²-[5''-nitro-2'''-furylacrylidene]-hydrazine

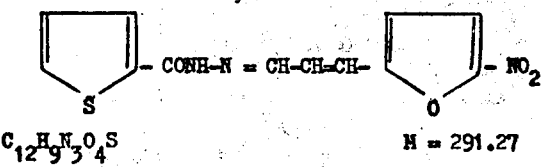

$C_{12}H_9N_3O_4S$  M = 291.27

14.2 g (mol/10) of N¹- (2'-thenoyl)-hydrazide in crude form are dissolved in 140 ml of methanol. 16.7 g (mol/10) of 5-nitro-2-furyl acrolein in 167 ml of tetrahydrofuran are added dropwise thereto. The solution is heated under reflux for one hour. Crystallisation is observed 5 minutes after completing the addition. After cooling, there is obtained a first cut of 16.9 g of yellow crystals, Mp = 219°-220° (with decomposition).

After concentrating the mother liquors, there are obtained a second cut of 1.1 g (yellow) Mp = 219°-220° C (with decomposition) and a third cut of 3.5 g (brown) of Mp = 212°-213° C (with decomposition). Yield : 21.5 g = 72.6 % (theoretical yield : 29.1 g).

After recrystallisation (alcohol + dimethyl formamide at 80°C), Mp = 219°-220° C (with decomposition).

Gravimetric analysis :

|  | C% | H% | N% | S% |
|---|---|---|---|---|
| Calculated : | 49.48 | 3.11 | 14.43 | 11.01 |
| Found : | 49.50 | 3.14 | 14.36 | 11.12 |
| — ν NH |  | 3,280 cm⁻¹ |  |  |
| — ν NO₂ |  | 1,540 cm⁻¹ |  |  |
| — ν CO (conjugated) |  | 1,650 cm⁻¹ |  |  |

EXAMPLE 7

N¹-[5'-nitro-2'-furylacrylidene]-N²-[Nα, Nε-2''-difuroyl-(±)lysyl]-hydrazine

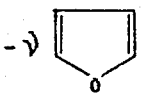

$C_{23}H_{23}N_5O_8$  M = 497.45 a) Nα-Nε-2'-difuroyl lysine ethyl ester :

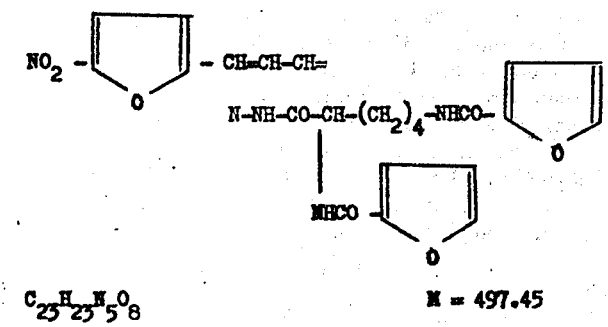

$C_{18}H_{22}N_2O_6$  M = 362.38

24.7 g (mol/10) of lysine dihydrochloride ethyl ester are dissolved in 200 ml of water containing 25.4 g (mol/3.3) of NaHCO₃. While stirring vigorously, there are simultaneously added : 26 g (mol/5) of furoyl chloride and 50 ml of an aqueous solution of 16.8 g (mol/5) of NaHCO₃. The addition lasts 20 minutes. Heating to 50° C takes place for one hour, followed by extraction with ethyl acetate and evaporation to dryness, the oily residue which is obtained slowly solidifying. The yield is 22.9 g = 63 % (theoretical yield : 36.2 g) as a white solid of Mp = 101°-102° C.

Analysis :

|  | C% | H% | N% |
|---|---|---|---|
| Calculated : | 59.65 | 6.12 | 7.73 |
| Found : | 59.70 | 6.16 | 7.85 |
| — ν NH (large) |  | 3,300 cm⁻¹ |  |
| — ν CO ester |  | 1,740 cm⁻¹ |  |
| — ν CO amide |  | 1,650 cm⁻¹ |  |
| — ν CH = CH (furan) |  | 3,060 – 3,120 cm⁻¹ |  |
|  |  | 1,020 – 1,080 cm⁻¹ |  |

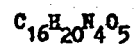

b) N¹-[Nα, Nε-2'-difuroyl (±) lysyl]-hydrazide :

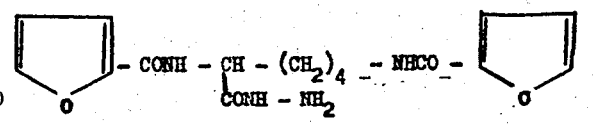

$C_{16}H_{20}N_4O_5$  M = 348.35

16.1 g (mol/20) of Nα, Nε-2-difuroyl (±) lysine ethyl ester, in solution in isopropanol, 10.2 g (mol/5 = 10 g) of NH₂ — NH₂ . 98 % H₂O and 0.5 ml of acetic acid are heated for 5 hours. The solution is evaporated to dryness and the residue is dispersed under ether, and there are obtained 16 g. yield = 92 % (theoretical yield 17.35 g) of a white product melting at 155°-158° C. After recrystallisation (ethanol), the melting point = 161°-162° C.

Analysis :

|  | C% | H% | N% |
|---|---|---|---|
| Calculated : | 55.17 | 5.78 | 16.08 |
| Found : | 55.12 | 5.80 | 16.04 |
| — ν NH |  | 3,350 cm⁻¹ |  |
| — ν CO (large) |  | 1,630 – 1,670 cm⁻¹ |  |
| — ν CH₂ |  | 2,950 cm⁻¹ |  | c. N¹-[5-nitro-2'-furylacrylidene]-N²-[Nα, Nε-2''-difuroyl (±) lysyl]-hydrazine

In accordance with the conditions of Example 3, starting with 8.7 g (mol/40) of N¹-[Nα, Nε-2'-difuroyl (±) lysyl]hydrazide, in 80 ml of methanol, there are obtained 11.6 g = 93 % (theoretical yield : 12.45 g) of a solid having an Mp= 205°-210°C. After recrystallisation (tepid dimethyl formamide + ether), Mp = 212°-213° C.

This product probably exists in two forms, because after the first recrystallisation, the melting point falls to 179°-180° C. By recrystallisation this product under the same conditions, a melting point = 212°-213° C is reached.

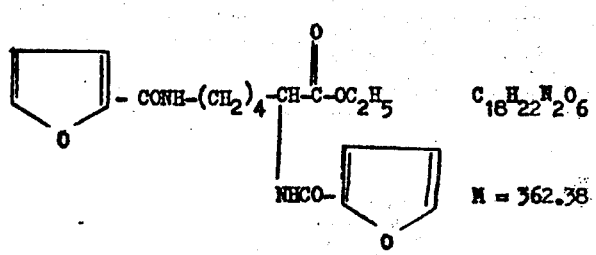

Analysis :

| | C% | H% | N% |
|---|---|---|---|
| Calculated : | 55.52 | 4.66 | 14.08 |
| Found : | 55.45 | 4.63 | 14.17 |

| | |
|---|---|
| $-\nu$ NH | 3,380 cm$^{-1}$ |
| $-\nu$ CH$_2$ | 2,940 cm$^{-1}$ |
| $-\nu$ HC=CH (furan) | 3,120 cm$^{-1}$ – 1,020 cm$^{-1}$ |
| $-\nu$ CO (enolised hydrazide) | 1,700 cm$^{-1}$ |
| OH<br>  \|<br>– C = N) | 1,650 cm$^{-1}$ (conjugated) |
| $-\nu$ NO$_2$ | 1,550 cm$^{-1}$ |

EXAMPLE 8

N$^1$-[carbobenzoxy (±) leucyl]-N$^2$-[5-nitro-2'-furylacrylidene]- hydrazine :

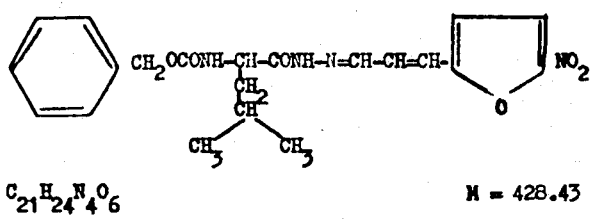

$C_{21}H_{24}N_4O_6$  M = 428.43 a. N-(±) carbobenzoxy (±) leucine ethyl ester :

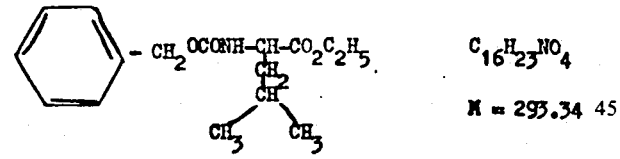

$C_{16}H_{23}NO_4$

M = 293.34

At about 0° C, 39.1 g (mol/5) of (±) leucine ethyl ester hydrochloride are dissolved in 100 ml of water containing 33.5 g (mol/2.5) of NaHCO$_3$. There are simultaneously added 34 g (mol/5) of carbobenzoxy chloride and 50 ml of an aqueous solution of 16.7 g (mol/5) of NaHCO$_3$. On completing the addition, stirring is continued for 10 minutes at ambient temperature. The oil which forms is extracted with ether and distilled. The yield is 37.3 g = 63.6 % (theoretical yield : 58.6 g) of a yellow oily product. Boiling point 0.37–0.4 = 138°–139.5° C.

Chromatography in vapour phase reveals the presence of 20 % of volatile impurities.

| | |
|---|---|
| $-\nu$ NH | 3,350 cm$^{-1}$ |
| $-\nu$ CO (large) | 1,730 cm$^{-1}$ | b. N-carbobenzoxy (±) leucyl hydrazide :

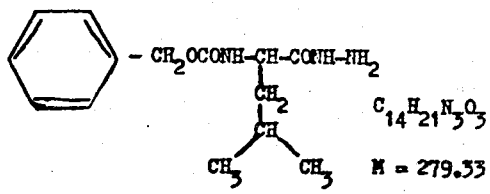

$C_{14}H_{21}N_3O_3$  M = 279.33

29.3 g (mol/10) of N-carbobenzoxy (±) leucine ethyl ester, 320 ml of ethanol, 20.4 g (mol/2.5 = 20 g) of 98 % hydrazine hydrate and 0.5 ml of acetic acid are left at ambient temperature for 48 hours and then evaporated to dryness. The residue is washed with water and extracted with ether. After evaporation of the ether, an oil is left which is dried under strong vacuum. The yield is 12.3 g = 44.2 % (theoretical yield : 27.9 g) of a product which melts at 104°–105° C. After recrystallisation (propylene oxide-heptane [2 : 1], Mp = 105°–108° C.

This product is not analytically pure and it is used as such.

| | |
|---|---|
| $-\nu$ NH$_2$ | 3,240 – 3,340 cm$^{-1}$ |
| $-\nu$ CH = CH (benzene) | 3,050 cm$^{-1}$ |
| $-\nu$ CO (amide) | 1,650 cm$^{-1}$ |
| $-\nu$ CO (Cbo) | 1,730 cm$^{-1}$ | c. N$^1$-[carbobenzoxy (±) leucyl]-N$^2$-[5-nitro-2'-furylacrylidene]- hydrazine :

To 14 g (mol/20 = 13.96 g) of carbobenzoxy (±) leucyl hydrazide in 80 ml of methanol are added 8.4 g (mol/20 # ) of 5-nitro-2-furyl acrolein in 84 ml of tetrahydrofuran. Crystallisation is produced before the addition is completed. Heating under reflux takes place for one hour, followed by concentration to half volume. At ambient temperature, ether is added, cooling takes place and there are obtained 10.9 g [yield = 88 % (theoretical yield : 12.4 g] of yellow solid, Mp = 142°–145° C.

After recrystallisation (ethanol) Mp = 145.5°–146° C.

Analysis :

| | C% | H% | N% |
|---|---|---|---|
| Calculated : | 58.87 | 5.64 | 13.08 |
| Found : | 58.75 | 5.71 | 13.12 |
| $-\nu$ NH | 3,320 cm$^{-1}$ | | |
| $-\nu$ CO | 1,690 cm$^{-1}$ | | |
| $-\nu$ NO$_2$ | 1,520–1,550 cm$^{-1}$ | | |

EXAMPLE 9

N$^1$-[N'-(2'-thenoyl) (±) leucyl]-N$^2$-[5''-nitro-2''-furylacrylidene]-hydrazine :

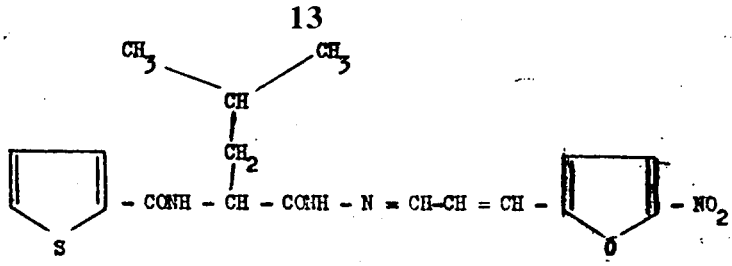

$C_{18}H_{20}N_4O_5S$     M = 404.43 a) N-(2-thenoyl) (±) leucine ethyl ester :

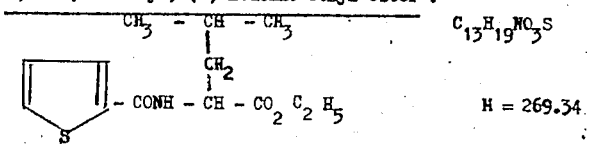    $C_{13}H_{19}NO_3S$

     M = 269.34

Method A

Starting from the free amino ester. Following the conditions of Example 4, with a yield of 67.6 %, a product is obtained which distils, $B_p$ = 133°–136° C, and then is solidified, Mp = 62°–64° C.

Method B

Starting from the hydrochloride (±) leucine ethyl ester. Following the conditions of Example 4, with a yield of 89.4 %, there is obtained a white solid of Mp = 66°–67° C ; the product distils, $B_p$ = 135°–137° C.

| Chromatography in vapour phase : V.P.C. (column = S. E. 30 ; T = 215° C ; $H_2$ = 50 ml/min) : purity= 100% | |
|---|---|
| — $\nu$ NH | 3,300 cm⁻¹ |
| — $\nu$ CH = CH (thiophene) | 3,100 cm⁻¹ |
| — $\nu$ CO | 1,720 cm⁻¹ | b. $N^1$-[$N'$-(2'-thenoyl) (±) leucyl]-hydrazide :

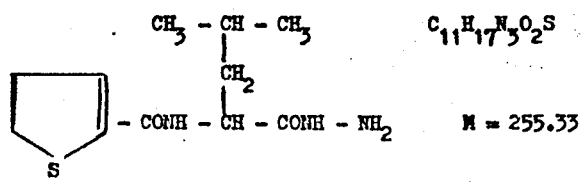    $C_{11}H_{17}N_3O_2S$

    M = 255.33

The following are left at ambient temperature for 48 hours : 13.5 g (mol/20 = 13.45 g) of N-2-thenoyl (±) leucine ethyl ester, 220 ml of ethanol, 10.2 g (mol/5 = 10 g) of $NH_2$-$NH_2$. 98 % $H_2O$ and 0.5 ml of acetic acid. By evaporation to dryness, an oily residue is obtained which, when ether is added, crystallises, yielding 10 g = 79 % (theoretical yield : 12.7 g) of a solid melting at 145°–147° C. After recrystallisation (ethanol) Mp = 146°–147° C.

Analysis :

|  | C% | H% | N% | S% |
|---|---|---|---|---|
| Calculated : | 51.75 | 6.71 | 16.46 | 12.96 |
| Found : | 51.78 | 6.65 | 16.40 | 12.59 |
| — $\nu$ NH |  | 3,200 cm⁻¹ |  |  |
| — $\nu$ CH= CH (thiophene) |  | 3,120 cm⁻¹ |  |  |
| — $\nu$ CO |  | 1,660 cm⁻¹ |  |  |
| — $\nu$ C - N |  | 1,370 cm⁻¹ |  |  | c. $N^1$-[$N'$-(2'-thenoyl) (±) leucyl] - $N^2$ -[(5''-nitro-2''-furyl)-acrylidene]-hydrazine Following the conditions of Example 8 and starting with 6.4 g (mol/40 = 6.38 g) of $N^1$-[$N'$-(2'thenoyl) (±) leucyl]-hydrazide. After heating under reflux for 2 hours, concentration to half volume, adding ether and crystallising at ambient temperature, there is obtained a first cut of 5.5 g of a yellow solid, Mp = 189°–190° C, and a second cut of 2.7 g of yellow solid, Mp = 177°–179° C.

The second cut, recrystallised from methanol, yields 1.3 g of product, Mp = 193°-194° C. Yield 6.8 g = 67.5 % (theoretical yield : 10.1 g). After recrystallisation from methanol, Mp = 194.5°-195° C.

Analysis :

|  | C% | H% | N% | S% |
|---|---|---|---|---|
| Calculated : | 53.46 | 4.98 | 13.86 | 7.92 |
| Found : | 53.50 | 5.01 | 13.79 | 8.00 |
| — $\nu$ NH |  | 3,340 cm⁻¹ |  |  |
| — $\nu$ CO (conjugated) |  | 1,640 cm⁻¹ |  |  |
| — $\nu$ CO |  | 1,690 cm⁻¹ |  |  |
| — $\nu$ NO₂ |  | 1,520–1,540 cm⁻¹ |  |  |

EXAMPLE 10

$N^1$-[$N'$-carbobenzoxy (±) seryl]-$N^2$-[5'-nitro-2'-furylacrylidene]- hydrazine :

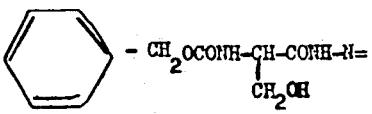

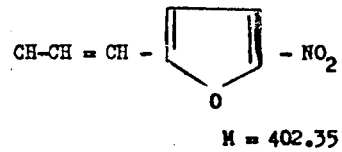

$C_{18}H_{18}N_4O_7$     M = 402.35

10 g (mol/25 #) of N-carbobenzoxy (±) seryl hydrazine are dissolved in 200 ml of tepid methanol. 6.7 g (mol/25) of 5-nitro-2-furyl acrolein in 51 ml of tetrahydrofuran are added at a temperature of 50° C. After heating under reflux for 2 hours, concentration to a third of the initial volume, addition of ether and after one night in the refrigerator, there are obtained 10.8 g = 67.5 % (theoretical yield = 16 g) of a product melting at 150°–151° C. After recrystallisation (ethanol), Mp =151°–152° C.

Analysis :

|  | C% | H% | N% |
|---|---|---|---|
| Calculated : | 53.73 | 4.50 | 13.93 |
| Found : | 53.90 | 4.67 | 13.98 |
| — $\nu$ NH |  | 3,420 cm⁻¹ |  |
| — $\nu$ CO |  | 1,700 - 1,730 cm⁻¹ |  |
| — $\nu$ NO₂ |  | 1,560 cm⁻¹ |  |

EXAMPLE 11

$N^1$-[5'-nitro-2'-thenoyl]-$N^2$-[5''-nitro-2''-furylacrylidene]- hydrazine :

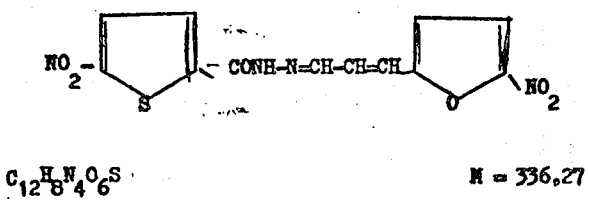

$C_{12}H_8N_4O_6S$  $M = 336.27$ a) Ethyl-5-nitro-2-thiophene carboxylate :

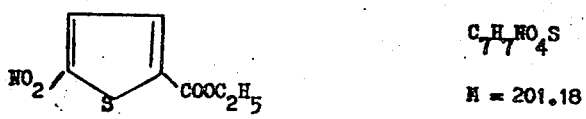

$C_7H_7NO_4S$  $M = 201.18$ 17.4 g (mol/10 = 17.31 g) of 5-nitrothiophene carboxylic acid are dissolved in 85 ml of absolute ethanol. A stream of gaseous hydrochloric acid is caused to enter the boiling solution to the point of saturation, and for 5 hours. Evaporation to dryness takes place and then the solid residue is washed with a sodium bicarbonate solution. It is suction-filtered and washed with water. After drying, there are obtained 17.7 g of a yellow product with a melting point of 63°–65° C and the yield is 88 % (theoretical yield = 88 %).

The $N_1$-(5'-nitro-2'-thenoyl)-hydrazide is prepared by reacting hydrazine with ethyl 5-nitro-2-thiophene carboxylate.

b. 6.3 g (mol/30 = 6.25 g) of $N^1$-[5'-nitro-2-thenoyl]-hydrazide are dissolved in 100 ml of dry tetrahydrofuran. 5.6 g (mol/30 = 5.55 g) of 5-nitro-2-furyl acrolein in 56 ml of tetrahydrofuran are added. Heating under reflux takes place for 1 hour and, 25 minutes after starting the heating, the crystallisation commences ; the crystals are suction-filtered, washed with ether and dried. There are obtained 7.9 g (yield 70 % - theoretical yield = 11.2 g) of a yellow solid of Mp = 235°–236° C.

Recrystallisation (tepid dimethyl formamide + ether) leaves the melting point unchanged.

Analysis :

|  | C% | H% | N% | S% |
|---|---|---|---|---|
| Calculated : | 42.85 | 2.40 | 16.66 | 9.53 |
| Found : | 42.87 | 2.37 | 16.58 | 9.45 |

$\gamma$ CO  $1,650\ cm^{-1}$ $C - NO_2$  $1,560\ cm^{-1}$ $C = N -$  $1,630\ cm^{-1}$

  $1,050 - 1,075\ cm^{-1}$

EXAMPLE 12

$N^1$-[(2'thenoyl) Nor (±) leucyl] - $N^2$-[5''-nitro-2''-furylacrylidene]- hydrazine

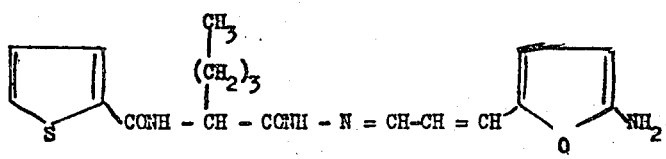

$C_{18}H_{20}N_4O_5S$  $M = 404.43$ a) Nor (±) leucine ethyl ester :

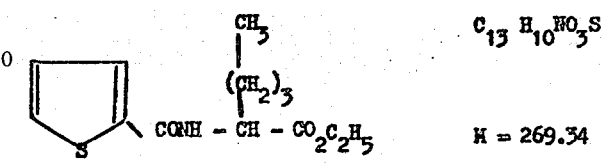

$C_8H_{17}NO_2$  $M = 159.22$ 66 g (mol/2) of Nor (±) leucine are suspended in 375 ml of absolute ethanol. Hydrochloric acid gas is introduced into the mixture at boiling point for 6 hours (until saturation is reached). The substance is evaporated to dryness and then the treatment is repeated with fresh ethanol. After again being evaporated to dryness, the crude hydrochloride is treated with chloroform, saturated with $NH_3$. By distillation, there are obtained 38.7 g of a colourless liquid of $B_{P\ 21} = 102°–103°$ C ; after redistillation $B_{P18} = 98°–99°$ C. V. P. C. = 100 %.

Analysis :

|  | C% | H% | N% |
|---|---|---|---|
| Calculated : | 60.34 | 10.76 | 8.80 |
| Found : | 60.30 | 10.80 | 8.75 |

|  | | | |
|---|---|---|---|
| Calculated : | 60.34 | 10.76 | 8.80 |
| Found : | 60.30 | 10.80 | 8.75 |

$\gamma\ NH_2$  $3,300 - 3,400\ cm^{-1}$

CO  $1,740\ cm^{-1}$

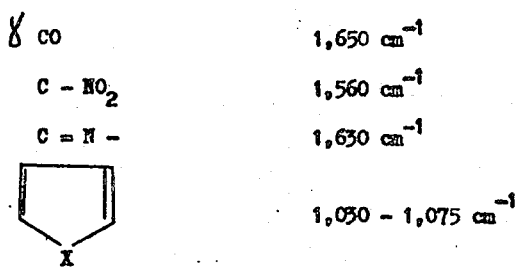  $1,170\ cm^{-1}$ b. (N-2'-thenoyl)-Nor (±) leucine ethyl ester :

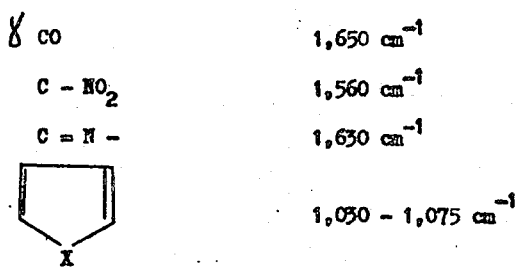

$C_{13}H_{19}NO_3S$  $M = 269.34$ 15.9 g (mol/10) of Nor (±) leucine ethyl ester are dissolved in 50 ml of pyridine, whereafter there are introduced 14.7 g (mol/10 = 14.65 g) of 2-thiophene carboxylic acid chloride. The mixture is left for one hour at ambient temperature and then it is poured into iced water. The oil which forms quickly crystallises. There are obtained 24 g of a light yellow product with a melting point of 80°–81° C, with a yield of 80.7 % (theoretical yield = 26.9 g). After recrystallisation (ethyl acetate), the melting point is 81°–82° C.

Analysis :

|  | C% | H% | N% | S% |
|---|---|---|---|---|
| Calculated : | 57.97 | 7.11 | 5.20 | 11.90 |
| Found : | 57.91 | 7.12 | 5.21 | 12.01 |

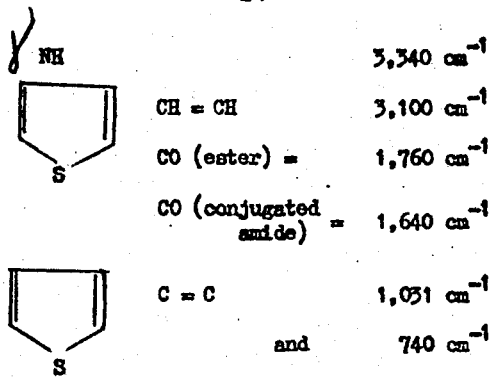

| | |
|---|---|
| γ NH | 3,340 cm$^{-1}$ |
| CH = CH | 3,100 cm$^{-1}$ |
| CO (ester) = | 1,760 cm$^{-1}$ |
| CO (conjugated amide) = | 1,640 cm$^{-1}$ |
| C = C | 1,031 cm$^{-1}$ |
| and | 740 cm$^{-1}$ | c. $N^1$-[(2'-thenoyl) Nor (±) leucyl]-hydrazide :

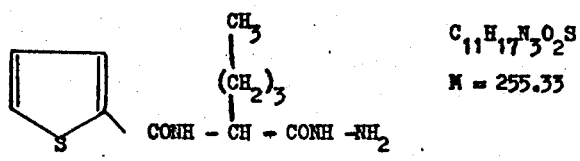

$C_{11}H_{17}N_3O_2S$

M = 255.33

13.5 g (mol/20 = 13.45 g) of $N^1$- 2-thenoyl -Nor-(±) leucine ethyl ester, 20 ml of isopropanol, 10.2 g (mol/5 = 10 g) of $NH_2—NH_2$. 98 % $H_2O$ and 0.5 ml of acetic acid are heated under reflux for 5 hours. The crude reaction mixture with addition of ether yields 11.5 g of white crystals with a melting point of 116°–118° C. Yield = 90 % (theoretical yield = 12.8 g). After recrystallisation (isopropanol), the melting point is 127°-128° C.

Analysis :

| | C% | H% | N% | S% |
|---|---|---|---|---|
| Calculated : | 51.75 | 6.71 | 16.46 | 12.96 |
| Found : | 51.77 | 6.69 | 16.47 | 12.54 |
| γ NH | 3,300 cm$^{-1}$ (a single peak) | | | |
| CO (conjugated) | 1,640 cm$^{-1}$ | | | |
| CO | 1,670 cm$^{-1}$ | | | | d. $N^1$-[(2'-thenoyl)-Nor-(±leucyl]-$N^2$-[5''-nitro-2''-furyl-acrylidene]-hydrazine :

8.5 g (mol/30) of $N^1$-[(2'-thenoyl)-Nor-(±) leucyl]-hydrazide in 180 ml of methanol and 5.6 g (mol/30) of 5-nitro-2-furyl acrolein in 56 ml of tetrahydrofuran are heated under reflux for 2 hours. After concentration to half volume, there are obtained, in two cuts : 7.7 g of product of melting point 188°–192° C, yield = 57.5 % (theoretical yield = 13.4 g).

After being recrystallised twice (ethyl acetate), the melting point is 200°–201° C (with decomposition).

Analysis :

| | C% | H% | N% | S% |
|---|---|---|---|---|
| Calculated : | 53.46 | 4.98 | 13.86 | 7.92 |
| Found : | 53.44 | 5.01 | 13.79 | 7.86 |

Infra-red spectrum:

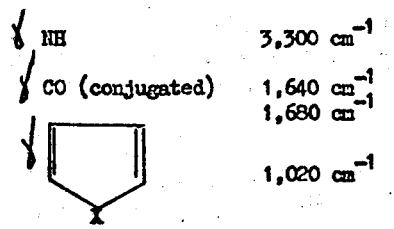

| | |
|---|---|
| γ NH | 3,300 cm$^{-1}$ |
| CO (conjugated) | 1,640 cm$^{-1}$ |
| | 1,680 cm$^{-1}$ |
| | 1,020 cm$^{-1}$ |

EXAMPLE 13

$N^1$-[5'-nitro-2'-furylacrylidene]-$N^2$-[(N''-carbobenzoxy)(+) tyrosyl]-hydrazine

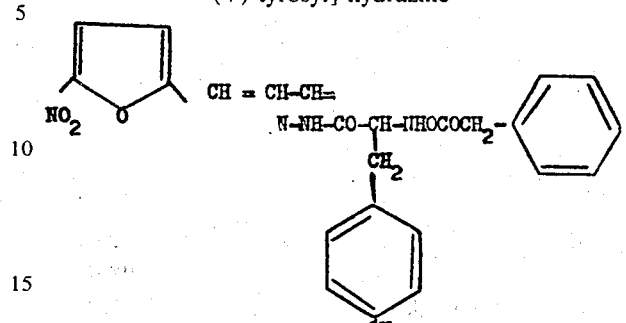

$C_{24}H_{22}N_4O_7$   M = 478.44

At 70° C, 11 g (mol/30 = 10.97 g) of (N-Cbo (±) tyrosyl)-hydrazide are dissolved in 180 ml of ethylene glycol and then 5.6 g (mol/30) of 5-nitro-2-furyl acrolein in 56 ml of tetrahydrofuran are introduced at a temperature of 60° C. Heating takes place for 2 hours at 60° C and then water is added until a clouding is formed. There is obtained an impure yellow solid, which is separated by filtering with suction. 16.3 g of product (theoretical yield = 16.1 g) are obtained with a melting point of 123°–125° C. After recrystallisation from 150 ml of methanol, a product with a melting point of 182-183° C is obtained in a yield of 9.1 g = 56.5 % (theoretical yield = 16.1 g).

After a second recrystallisation from methanol, the melting point is 184°–185° C.

Analysis :

| | C% | H% | N% |
|---|---|---|---|
| Calculated : | 60.24 | 4.64 | 11.70 |
| Found : | 60.20 | 4.63 | 11.66 |
| γ OH | 3,600 – 3,400 cm$^{-1}$ (large) | | |
| NH | 3,240 CO (amido) = 1,690 cm$^{-1}$ | | |
| CO = | 1,740 cm$^{-1}$ C—$NO_2$ = 1,520 – 1,550 cm$^{-1}$ | | |

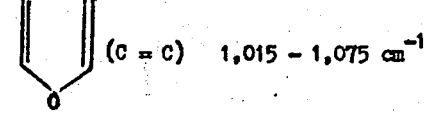

(Cbo) (C = C) 1,015 – 1,075 cm$^{-1}$

EXAMPLE 14

$N^1$-[N'-2'-furoyl (±) tyrosyl]-$N^2$-[5''-nitro-2''-furylacrylidene]-hydrazine

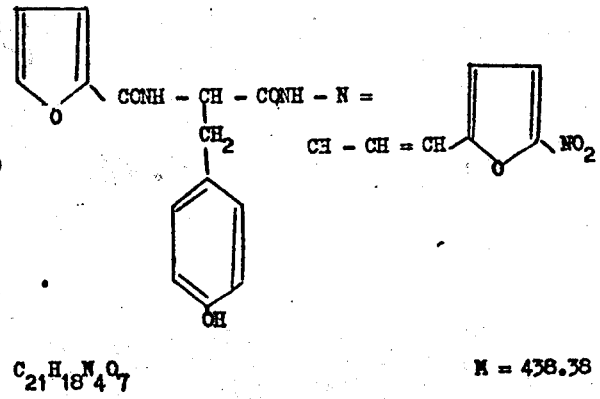

$C_{21}H_{18}N_4O_7$   M = 438.38 a) N-2'-furoyl (±) tyrosine methyl ester :

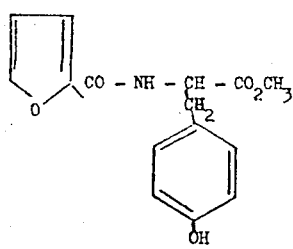

$C_{15}H_{15}NO_5$

M = 289.27

Between 0° and + 5° C, 23.2 g (mol/10 = 23.16 g) of a hydrochloride of tyrosine methyl ester are dissolved in 100 ml of water which contain 33.5 g (mol/10) of $NaHCO_3$. While stirring, there are simultaneously added : 13 g (mol/10) of furoyl chloride and 8.5 g (mol/10) of $NaHCO_3$, in 85 ml of water. Heating takes place at 50° C for one hour, the product is agglomerated and it solidifies when the heating is terminated. After filtering with suction and washing with water, there are obtained 24.6 g of a slightly coloured product which has a melting point of 117°–119° C, the yield being 85.4 % (theoretical yield 28.9 g). After recrystallisation (ethyl acetate + traces of hexane), the melting point is raised to 123°–125° C.

Analysis :

|  | C% | H% | N% |
|---|---|---|---|
| Calculated : | 62.29 | 5.22 | 4.84 |
| Found : | 62.24 | 5.20 | 4.77 |

$\nu$ OH 3,680 – 3,400 $cm^{-1}$ (large)   745 $cm^{-1}$

CO (ester) 1,740 $cm^{-1}$   880 $cm^{-1}$

CO (amide 1,640 $cm^{-1}$ conjugated)   1,020 $cm^{-1}$
   1,170 $cm^{-1}$ $R\ CO_2CH_3$ b) $N^1$-[$N'$-2'-furoyl (±) tyrosyl]-hydrazide :

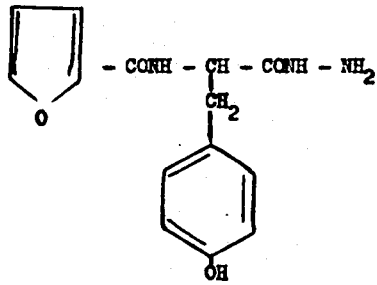

$C_{14}H_{15}N_3O_4$   M = 289;28

The following are left at ambient temperature for 48 hours : 14.5 g (mol/20 # ) of N-furoyl (±) tyrosine methyl ester in 220 ml of alcohol (to be made tepid for dissolving purposes), 10.2 g (mol/5 =10 g) of $NH_2$—$NH_2$.98 % $H_2O$ and 0.5 ml of acetic acid. Crystallisation occurs and, after being left for a short time in the refrigerator and adding ether, there are obtained by suction-filtering 10.2 g of white product, yield = 70.6 % (theoretical yield = 14.45 g), with a melting point of 174°–175° C. After recrystallisation from ethanol, the melting point is 175.5°–176° C. n Analysis :

|  | C% | H% | N% |
|---|---|---|---|
| Calculated : | 58.12 | 5.22 | 14.52 |
| Found : | 58.10 | 5.30 | 14.48 |

$\gamma$ OH   3,600 – 3,400 $cm^{-1}$
NH   3,300 $cm^{-1}$
CO (conjugated)   1,650 $cm^{-1}$ c. $N^1$-[$N'$-2'-furoyl (±) tyrosyl]-$N^2$-[5''-nitro-2''-furylacrylidene]- hydrazine :

At the temperature of 60° C, 14.5 g (mol/20 # ) of $N^1$-[$N'$-2'-furoyl (± tyrosyl]-hydrazide are dissolved in 320 ml of ethylene glycol. At a temperature lower than 60° C, 8.4 g (mol/20) of 5-nitro-2-furyl acrolein in 84 ml of tetrahydrofuran are introduced thereinto. After heating at 80° C for 4 hours, the tetrahydrofuran is evaporated under vacuum.

By filtering with suction (difficult) and after washing with water, a yellow solid is separated which has a melting point of 192°–194° C. After recrystallisation (water-dimethyl-formamide 1 : 1), Mp = 229°–230° C, yield = 12.4 g = 57 % (theoretical yield = 21.6 g).

Analysis :

|  | C% | H% | N% |
|---|---|---|---|
| Calculated : | 57.55 | 4.13 | 12.77 |
| Found : | 57.53 | 4.14 | 12.79 |

$\nu$ OH   3,540 $cm^{-1}$ (sharp)   CO   1,680 $cm^{-1}$

NH   3,300 $cm^{-1}$   CO (conjugated)   1,650 $cm^{-1}$

CH = CH   3,120 $cm^{-1}$   1,020 $cm^{-1}$
   1,080 $cm^{-1}$
   750 $cm^{-1}$
   880 $cm^{-1}$

EXAMPLE 15

$N^1$-[$N'$ -(5'-nitro-2'-thenoyl (±) phenylalanyl]-$N^2$-[5''-nitro-2''-furylacrylidene]- hydrazine :

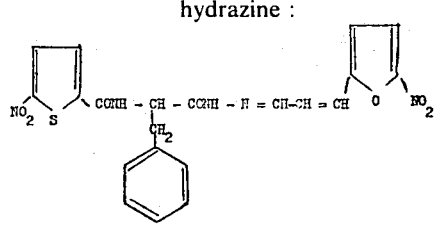

$C_{21}H_{17}N_3O_7S$       M = 483.45 a) N-[5'-nitro-2'-thenoyl] (±) phenyl alanine ethyl ester :

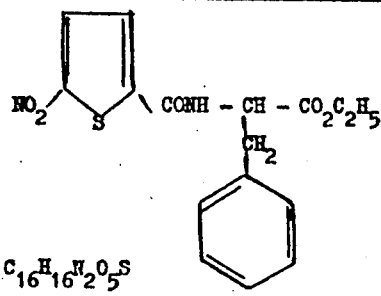

$C_{16}H_{16}N_2O_5S$       M = 348.37

19.3 g (mol/10 #) of (±) phenyl alanine ethyl ester are dissolved in 150 ml of pyridine. 19.2 g (mol/10 = 19.15 g) of 5-nitro-2-thenoyl chloride are added in small portions. After stirring at ambient temperature for 1 hour, cooling in iced water, filtering with suction and washing with water, there are isolated 29 g of a product having a melting point of 150°–151° C, with a yield of 83.5 % (theoretical yield = 34.8 g).

After recrystallisation from ethanol, the melting point is 150°–151° C.

Analysis :

|  | C% | H% | N% | S% |
|---|---|---|---|---|
| Calculated : | 55.16 | 4.63 | 8.04 | 9.20 |
| Found : | 55.18 | 4.59 | 8.02 | 9.22 |

| γ NH | 3,300 cm⁻¹ | C-NO₂ | 1,560 cm⁻¹ |
|---|---|---|---|
| CO (ester) | 1,740 – 1,750 cm⁻¹ (split up) | | |
| CO (conjugated amide) | 1,630 cm⁻¹ | | | b.  $N^1$-[$N'$-(5'-nitro-2'-thenoyl)](±) phenylalanyl -hydrazide :

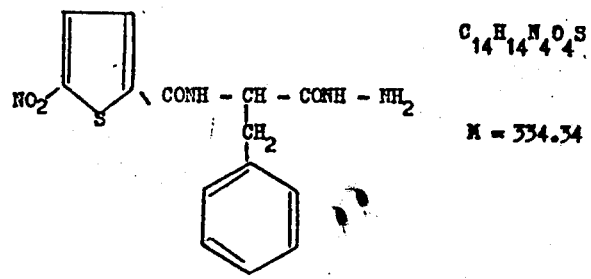

$C_{14}H_{14}N_4O_4S$

M = 334.34

20.8 g (mol/16.7) of N -[N'-(5'-nitro-2'-thenoyl)](±) phenyl alanine ethyl ester are dissolved in 175 ml of tetrahydrofuran and 175 ml of methanol. 9.2 g (mol/5.55 = 9 g) of 98 % hydrazine hydrate in solution in 30 ml of methanol are then introduced slowly at ambient temperature (in about 1 hour). The substance is left at ambient temperature for 48 hours and is then heated under reflux for 1 hour. After concentration to half volume, followed by adding ether, there is isolated a first cut of 11 g of yellow product of melting point 190°–192° C and a second cut of 3.4 g of yellow product of melting point = 180°–185° C. After recrystallisation of the 14.4 g from 650 ml of ethanol, 8 g. yield = 40 % (theoretical yield = 20 g) of yellow product of Mp = 206°–208° C are obtained, and following a second recrystallisation from ethanol, the melting point is 214°–216° C.

Analysis :

|  | C% | H% | N% | S% |
|---|---|---|---|---|
| Calculated : | 50.29 | 4.20 | 16.76 | 9.61 |
| Found : | 50.27 | 4.18 | 16.79 | 9.64 | c. $N^1$-[$N'$-(5'-nitro-2'-thenoyl) (±) phenylalanyl]-$N^2$-[5''-nitro-2''-furylacrylidene]-hydrazine :

10.1 g (mol/33) of $N^1$-[$N'$-(5'-nitro-2'-thenoyl) (±) phenylalanyl]-hydrazine are dissolved at boiling point in 280 ml of tetrahydrofuran. 4.9 g (mol/33) of 5-nitro-2-furyl acrolein in 49 ml of tetrahydrofuran are added dropwise thereto.

After heating for 2 hours under reflux, evaporation to dryness is effected and then ether is recovered. There are isolated 13 g of yellow product having a melting point of 131°–133° C with a yield of 89 % (theoretical yield 14.6 g). After recrystallisation (ethanol-dimethyl formamide 1 : 1 and traces of water), the melting point becomes 221.5°–222° C.

Analysis :

|  | C% | H% | N% | S% |
|---|---|---|---|---|
| Calculated : | 52.18 | 3.54 | 14.49 | 6.63 |
| Found : | 52.20 | 3.57 | 14.50 | 6.62 |

| ν NH | 3,280 cm⁻¹ | C-NO₂ | 1,540–1,550 cm⁻¹ |
|---|---|---|---|
| CO | 1,680 cm⁻¹ | | |
| CO (conjugated) | 1,630 cm⁻¹ | | |

EXAMPLE 16

$N^1$-[(5'-nitro-2'-furylacrylidene)]-$N^2$-[(N'-5''-nitro-2''-thenoyl) (±) seryl]-hydrazine

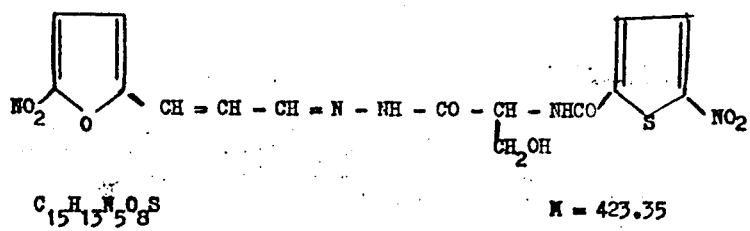

$C_{15}H_{13}N_5O_8S$       M = 423.35 a) N-(5'-nitro-2'-thenoyl) (±) serine ethyl ester :

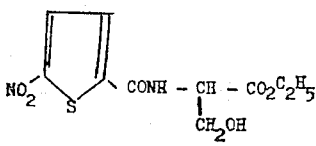

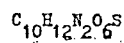         M = 288.28

53.8 g (mol/5) of (±) serine ethyl ester hydrochloride are dissolved at about 0° C in 100 ml of water containing 33.5 g (mol/2.5) of dry $NaHCO_3$. There are simultaneously added, while stirring, 38.4 g (mol/5) of 5-nitro-2-thenoyl chloride and 85 ml of an aqueous solution of 16.7 g (mol/5) of $NaHCO_3$. After heating at 50° C for 1 hour, washing with water and drying, there are isolated 39.3 g of crystalline product having a melting point of 112°–115° C ; yield = 68 % (theoretical yield = 57.6 g). The mother liquors, acidulated, yield 4.2 g of white product with a melting point of 154°–156° C, which does not contain any alcohol or amine function.

The main product, recrystallised from ethanol, has a melting point of 126°–127° C.

Analysis:

|  | C% | H% | N% | S% |
|---|---|---|---|---|
| Calculated : | 41.66 | 4.19 | 9.71 | 11.12 |
| Found : | 41.68 | 4.20 | 9.69 | 11.14 |

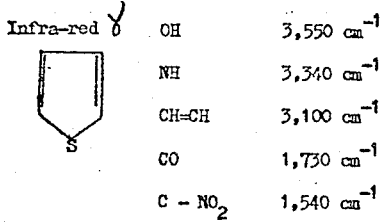

b) N¹-[5'-nitro-2'-thenoyl) (±) seryl]-hydrazide :

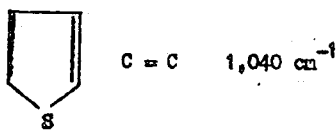

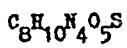         M = 274.25

14.4 g (mol/20) of N¹- (5'-nitro-2'-thenoyl) (±) serine ethyl ester are dissolved in 200 ml of methanol. At a temperature of 5°C, 7.7 g (mol/6.66 = 7.5 g) of $NH_2NH_2$. 98 % $H_2O$ in 24 ml of methanol are very slowly added.

After the addition, the mixture is cooled to 0° C and stirring is continued for 2 hours. The mixture is left at ambient temperature for 48 hours. After filtering with suction and washing with ether, there are isolated 13.1 g = 95.6 % (theoretical yield = 13.7 g) of a product melting at 189° C. After recrystallisation from water, the melting point is 190° C (with decomposition).

Analysis :

|  | C% | H% | N% | S% |
|---|---|---|---|---|
| Calculated: | 35.03 | 3.67 | 20.47 | 11.69 |
| Found : | 35.05 | 3.69 | 20.50 | 11.79 |

γ OH   3,600 – 3,400 cm⁻¹   CO (conjugated) 1,640 cm⁻¹
NH    3,300 cm⁻¹
CO    1,670 cm⁻¹ c. N¹-[(5'-nitro-2'-furylacrylidene)-N²-(N'-5''-nitro-2''-thenoyl) (±) seryl]-hydrazine :

9.2 g (mol/30) of N¹-[5'-nitro-2'-thenoyl (±) seryl]-hydrazide are dissolved at 60° C in 210 ml of ethylene glycol. 5.6 g (mol/30 = 5.56 g) of 5-nitro-2-furylacrolein in 56 ml of tetrahydrofuran are added to the solution. After heating for 2 hours at 60° C, the tetrahydrofuran is driven off under vacuum and water is added to the residue. 12.1 g of product crystallises, this product melting at 217° C with decomposition. Yield = 85 % (theoretical yield = 14.1 g). After recrystallisation from ethyl acetate - dimethyl formamide (2 : 1), the melting point is 217° C (with decomposition).

Analysis :

|  | C% | H% | N% | S% |
|---|---|---|---|---|
| Calculated : | 42.56 | 3.09 | 16.55 | 7.57 |
| Found : | 42.58 | 3.13 | 16.50 | 7.60 |

γ OH   3,520 cm⁻¹   CO 1,700 cm⁻¹   C = N   1,630 cm⁻¹
NH    3,320 cm⁻¹   CO 1,650 cm⁻¹ (conjugated)   C-$NO_2$   1,540 cm⁻¹

Of the above compounds in accordance with the present invention, those preferred are the compounds of Examples 4–6 and 11; of these the compounds of Examples 5 and 11 are the most interesting, with the compound of Example 11 being the most effective.

The following additional Examples of various medicinal formulations in accordance with the present invention are offered illustratively:

Example 17 - Compressed tablet
| Active substance | 200 mg. |
|---|---|
| corn starch | 44 mg. |
| trialinium phosphate | 20 mg. |
| lactose | 25 mg. |
| potato starch | 9 mg. |
| magnesium stearate | 2 mg. |
|  | 300 mg. |

Example 18 - Capsule
| Active substance | 200 mg. |
|---|---|
| lactose | 10 mg. |
| talc | 20 mg. |
| corn starch | 30 mg. |
|  | 260 mg. |

Example 19 - Pediatric liquid
| Active substance | 0.8 g. |
|---|---|
| Veegum K | 2.0 g. |
| Na carboxymethyl cellulose | 0.3 g. |
| Sucrose | 40.0 g. |
| Emulson O (condensation product of ethylene oxide and castor oil; M.W ~ 2500) | 0.15 g. |
| Na methyl p-oxybenzoate | 0.10 g. |
| Na propyl p-oxybenzoate | 0.05 g. |
| Apricot flavoring | 0.013 g. |
| Banana flavoring | 0.5 g. |
| Citric acid - sufficient to provide a pH of about 7 | |
| purified water - sufficient to make 100 ml. of suspension | |

In each of Examples 17–19, the compounds of Example 2–16 are used as the active substance. If desired, the active substance may consist of mixtures of compounds falling within the generic formula, or even mixtures of such compounds with other previously known compounds which exhibit similar activity.

The foregoing description of the specific embodiments will so fully reveal the general nature of the invention that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation.

What is claimed is:

1. A pharamaceutical composition adapted for administration to obtain an antibacterial effect, comprising, per dosage unit a pharmaceutically acceptable excipient, and
   an antibacterially effective non-toxic amount of a compound of the formula

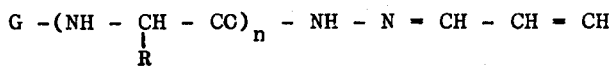

wherein $n$ is 1 or 0; G is thenoyl, nitrothenoyl or carbobenzoxy; and R is H, methyl, butyl, isobutyl, δ-(2-furoyl) aminobutyl, benzyl, hydroxymethyl or p-hydroxybenzyl.

2. The composition of claim 1 wherein said compound is $N^1$ - [5' - nitro - 2' thenoyl] - $N^2$ - [5'' - nitro - 2'' -furylacrylidene] - hydrazine.

3. A composition in accordance with claim 1 in a form adapted for oral administration.

4. A composition in accordance with claim 1 in unit dosage form wherein said compound is present in an amount of 10 to 500 mg.

5. A composition in accordance with claim 1 wherein said compound has the formula

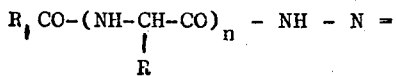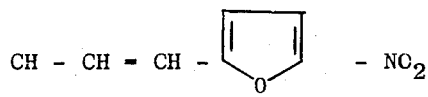

wherein $R_1$ is 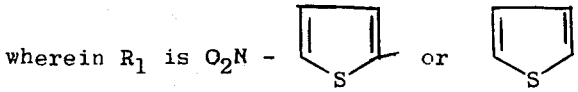

6. A composition in accordance with claim 5 wherein R is H or $n$ is 0.

7. A composition in accordance with claim 6 wherein said compound is selected from the group consisting of $N^1$ -[5'-nitro-2'-thenoyl] -$N^2$ -[5''-nitro-2''-furylacrylidene] -hydrazine and $N^1$ -[5'-nitro-2'-thenoylglycyl] -$N^2$ -[5''-nitro-2''-furylacrylidene] - hydrazine.

8. A pharmaceutical composition adapted for administration to obtain an antibacterial effect, comprising, per dosage unit a pharmaceutically acceptable excipient, and
   an antibacterially effective nontoxic amount of a compound of the formula G - NH - CH(R) - CO - NH - N = CH - CH = 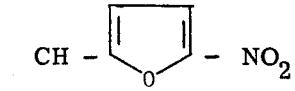

wherein
   G is furoyl, thenoyl, nitrothenoyl or carbobenzoxy; and R is H, methyl, butyl, isobutyl, δ-(2-furoyl) aminobutyl, benzyl, hydroxymethyl or p-hydroxybenzyl.

9. A method for treating bacterial infections which comprises administering an antibacterially effective non-toxic amount of the compound of claim 1 to a patient.

* * * * *

UNITED STATES PATENT OFFICE
CERTIFICATE OF CORRECTION

PATENT NO. : 3,914,379
DATED : October 21, 1975
INVENTOR(S) : SZARVASI et al

It is certified that error appears in the above—identified patent and that said Letters Patent are hereby corrected as shown below:

Column 9, lines 37-38, Example 7, should read
--$N^1$-[5'-nitro-2'furylacrylidene]-$N^2$-[$N^\alpha,N^\epsilon$-2"-difuroyl-($\pm$)lysyl]-hydrazine:--

Column 13, line 22, "$B_p$" should read --$B_{p_{0.19}}$--

" " line 29, "$B_p$" should read --$B_{p_{0.3}}$--

Column 20, line 7, delete "n" at the end of the line

Column 21, line 49, the beginning of the formula is
--$N^1$-[N'-(5'-nitro-2'- --

Column 23, line 11, "53.8 g" should read --33.8 g--

Signed and Sealed this seventeenth Day of February 1976

[SEAL]

Attest:

RUTH C. MASON
*Attesting Officer*

C. MARSHALL DANN
*Commissioner of Patents and Trademarks*